US010246177B2

(12) United States Patent
 Tachibana et al.

(10) Patent No.: US 10,246,177 B2
(45) Date of Patent: Apr. 2, 2019

(54) LEADING-EDGE STRUCTURE FOR AIRCRAFT, AIRCRAFT WING, AND AIRCRAFT

(71) Applicant: Mitsubishi Aircraft Corporation, Aichi (JP)

(72) Inventors: Kazuki Tachibana, Tokyo (JP); Kohei Hara, Tokyo (JP)

(73) Assignee: MITSUBISHI AIRCRAFT CORPORATION, Aichi (JP)

( * ) Notice: Subject to any disclaimer, the term of this patent is extended or adjusted under 35 U.S.C. 154(b) by 338 days.

(21) Appl. No.: 15/240,068

(22) Filed: Aug. 18, 2016

(65) Prior Publication Data
 US 2017/0057616 A1 Mar. 2, 2017

(30) Foreign Application Priority Data
 Aug. 26, 2015 (JP) .................................. 2015-166308

(51) Int. Cl.
 *B64C 3/28* (2006.01)
 *B64C 3/18* (2006.01)
 *B64C 3/26* (2006.01)

(52) U.S. Cl.
 CPC .............. *B64C 3/28* (2013.01); *B64C 3/185* (2013.01); *B64C 3/187* (2013.01); *B64C 3/26* (2013.01)

(58) Field of Classification Search
 CPC ............. B64C 2000/146; B64C 3/28; B64D 2045/0095
 USPC .................................................... 244/123.1
 See application file for complete search history.

(56) References Cited

U.S. PATENT DOCUMENTS

| 2,613,893 | A | * | 10/1952 | Young | B64C 3/28 244/123.1 |
| 3,174,711 | A | * | 3/1965 | Sullivan | B64C 3/28 244/123.1 |
| 7,871,041 | B2 | * | 1/2011 | Brice | B64F 5/00 244/123.1 |
| 8,746,619 | B2 | * | 6/2014 | Li | B64C 3/28 244/121 |

(Continued)

FOREIGN PATENT DOCUMENTS

| CA | 2 560 978 A1 | 10/2005 |
| JP | 2007-532397 A | 11/2007 |

(Continued)

OTHER PUBLICATIONS

European Extended Search Report for EP 16 18 4482 dated Jan. 5, 2017.

*Primary Examiner* — Christopher P Ellis
(74) *Attorney, Agent, or Firm* — Pearne & Gordon LLP (57) ABSTRACT

The present invention has an objective to provide a leading-edge structure for an aircraft that is capable of, in the case of a collision with an airborne object, effectively absorbing the energy of the collision with the airborne object, with no increase in its weight. A leading-edge structure (10) for an aircraft according to the present invention includes a spar (11) extending in a predetermined direction, a plurality of ribs (13) provided in the predetermined direction of the spar (11) at intervals, and a skin (17) supported by the plurality of ribs (13). The ribs (13) includes first ribs 14 and a plurality of second ribs 15 that are disposed between the pair of first ribs (14). The second ribs (15) do not support the skin in the vicinity of their front ends.

19 Claims, 7 Drawing Sheets

(56) References Cited

U.S. PATENT DOCUMENTS

| | | | |
|---|---|---|---|
| 9,187,170 B2* | 11/2015 | Lecerf | B64C 3/28 |
| 9,708,030 B1* | 7/2017 | Gabrys | B63B 1/244 |
| 2008/0265095 A1 | 10/2008 | Lee et al. | |
| 2009/0127392 A1* | 5/2009 | Gross | B32B 3/02 |
| | | | 244/121 |
| 2009/0277996 A1* | 11/2009 | Rinaldi | B64C 3/28 |
| | | | 244/123.1 |
| 2010/0148006 A1* | 6/2010 | Olmi | B64C 3/28 |
| | | | 244/121 |
| 2010/0162567 A1* | 7/2010 | Kirkwood | B64C 3/28 |
| | | | 29/897.2 |
| 2014/0166818 A1 | 6/2014 | Tanaka | |
| 2015/0298787 A1* | 10/2015 | Nordin | B64C 3/28 |
| | | | 244/45 R |
| 2017/0259902 A1* | 9/2017 | Cebolla Garrofe | B64C 3/185 |
| 2018/0170520 A1* | 6/2018 | Menard | B64C 1/12 |

FOREIGN PATENT DOCUMENTS

| | | |
|---|---|---|
| WO | 2006/010699 A1 | 2/2006 |
| WO | 2013/027388 A1 | 3/2015 |

* cited by examiner

LEADING-EDGE STRUCTURE FOR AIRCRAFT, AIRCRAFT WING, AND AIRCRAFT

BACKGROUND OF THE INVENTION

Field of the Invention

The present invention relates to a leading-edge structure for an aircraft, in particular, to a leading-edge structure that is capable of reducing an impact when colliding with a bird.

Description of the Related Art

During flight, in particular low-altitude flight, an aircraft may collide with an airborne object such as a bird or a piece of ice, and thus its airframe is designed and fabricated so as to withstand even a collision with an airborne object. However, increasing the strength of the airframe leads to an increase in weight of the airframe. Therefore, an unreasonable increasing of the strength is not allowed.

Hence, proposals have been made in consideration of a collision with an airborne object.

For example, JP 2007-532397 A1 proposes absorbing kinetic energy caused by a collision with a bird by means of plastic deformation of a stringer over a considerable length. As a specific configuration, according to JP 2007-532397 A1, the stringer is disposed being brought into contact with a plurality of ribs so as to support an outer skin.

WO 2013/27388 A1 proposes that, out of a plurality of rib members disposed in the longitudinal direction of a slat at intervals, a pair of rib members are coupled by a coupling member, typically a wire cable. According to WO 2013/27388 A1, a slat is prevented from being broken into pieces between a pair of rib members even when a bird collides with the slat during flight of an aircraft, and the slat suffers such damage that not only a skin but also a rib member of the slat deforms.

It is noted that, in the present application, "forward" and "rearward" are defined on the basis of the direction in which the aircraft flies.

SUMMARY OF THE INVENTION

Technical Problem

The proposal of JP 2007-532397 A1 is only to dispose stringers so as to be brought into contact with a plurality of ribs for an effective absorption of energy. Thus, it is possible to minimize an increase in weight. However, considering fuel efficiency of an aircraft, it is desirable that the weight is not increased but preferably reduced. Also in WO 2013/27388 A1, since the pair of rib members are coupled by a coupling member, the weight is increased by at least the coupling member.

Thus, the present invention has an objective to provide a leading-edge structure for an aircraft that is capable of, in the case of a collision with an airborne object, effectively absorbing the energy of the collision with the airborne object while its weight is not increased but preferably reduced.

Solution to Problem

The present invention is a leading-edge structure for an aircraft that constitutes any leading-edge portion in the airframe of the aircraft, and includes a spar that extends in a predetermined direction, a plurality of ribs that are provided in the predetermined direction of the spar at intervals, and a skin that is supported by the plurality of ribs, wherein among the plurality of ribs, one or more of the ribs have a front end that is provided with a gap with the skin.

For a leading-edge structure for an aircraft according to the present invention, attention is paid to a maximum utilization of plastic deformation of a skin to absorb the energy of a collision with an airborne object. That is, as described in JP 2007-532397 A1 and WO 2013/27388 A1, in a conventional leading-edge structure, since all ribs contact and support a skin also at their front ends, it is considered that the skin is supported at both ends by a pair of adjacent ribs. Moreover, the skin is fixed by fasteners at portions corresponding to the front ends of the ribs and the other portions. Therefore, in this conventional leading-edge structure, when an airborne object collides, a rupture of the skin starts from a fastener of the front end of a rib as a start point, and the skin is subjected to plastic deformation in a span L between the ribs by which the skin is supported at both ends. The absorption of energy is limited to a value corresponding to this span L, and thus the skin is prone to be broken in a relatively early stage.

In this regard, when the span L between adjacent ribs is increased, it is possible to increase the amount of plastic deformation of a skin accordingly, increasing the amount of energy absorption. However, increasing the span L leads to a decrease in the number of ribs provided in a leading-edge structure. Now, since the ribs serve originally the purpose of stiffening a skin, it is not allowed to increase the span L by simply decreasing the number of ribs.

Thus, in the present invention, while ribs are disposed as many as needed for stiffening that is originally intended, ribs each having a front end provided with gaps with a skin are selectively provided, so as to eliminate fasteners that may be a start point of a rupture of the skin as well as to increase the span L substantially. This enables, in the case of a collision with an airborne object, securing the amount of plastic deformation of the skin, increasing the amount of energy absorption. Meanwhile, when the selectively provided ribs support the skin except for ranges other than their front ends, the selectively provided ribs can serve the original purpose of stiffening the skin. Moreover, there is no need to provide new members for providing gaps between the front ends and the skin, and moreover, the weight of the ribs can be reduced by the gaps. Therefore, no increase in weight occurs. Furthermore, it takes a time to attach fasteners at the front ends of ribs. Therefore, by obviating an operation of attaching these fasteners at the front ends of the ribs, it is possible to shorten a manufacturing time of the leading-edge structure.

In the leading-edge structure according to the present invention, it is preferable that as the plurality of ribs, the leading-edge structure includes a pair of first ribs and a plurality of second ribs, the pair of first ribs being disposed with a predetermined interval, the plurality of second ribs disposed between the pair of first ribs, and gaps are provided between the front ends of the second ribs and the skin.

According to this leading-edge structure, the front ends of the plurality of second ribs disposed between the pair of first ribs are provided with the gaps with the skin. Therefore, assuming that the ribs are disposed at regular intervals of the span L, the skin can perform plastic deformation corresponding to at least 3 L. Therefore, it is possible to increase the amount of energy absorption.

It is noted that the combination described here of the pair of first ribs and the plurality of second ribs disposed therebetween represents a minimal configuration. An actual leading-edge structure can include more than one of this minimal configuration.

In the leading-edge structure according to the present invention, it is preferable that the pair of first ribs have a stiffness higher than that of the second ribs.

The first ribs support the skin also with their front ends. Therefore, by having a stiffness higher than that of the second ribs accordingly, the first ribs fulfill the purpose of stiffening the skin.

In the leading-edge structure according to the present invention, it is preferable that the pair of first ribs are fixed to the spar, but the second ribs are not fixed to the spar.

For example, this is convenient because the second ribs can be detached collectively together with the skin when a leading-edge structure is detached in a maintenance check. Meanwhile, the second ribs can serve the purpose of stiffening the skin although not being fixed to the spar as long as the second ribs support the skin at portions other than those corresponding to their front ends.

The present invention provides a wing of an aircraft including the leading-edge structure described above and a wing body that is connected to this leading-edge structure. This wing is applied to at least one of a main wing, a horizontal tail, and a vertical tail.

In addition, the present invention provides an aircraft including the above wing.

Advantageous Effects of Invention

With the leading-edge structure according to the present invention, in the case of a collision with an airborne object, it is possible to absorb effectively the energy of the collision with the airborne object by increasing the amount of plastic deformation of the skin. Moreover, according to the present invention, an increase in weight does not occur. Moreover, it is possible in manufacture to obviate an operation of attaching fasteners at the front ends of ribs, which is time-consuming, also enabling the reduction in a production time of a leading-edge structure.

BRIEF DESCRIPTION OF THE DRAWINGS

FIGS. 2A and 2B illustrate the configuration of the leading-edge portion of the vertical tail in the present embodiment, where

FIGS. 5A and 5B illustrate the results of simulations to confirm effects of the structure of an aircraft tail in the present embodiment, where

DETAILED DESCRIPTION OF THE PREFERRED EMBODIMENT

Hereinafter, an embodiment of the present invention will be described with reference to the accompanying drawings.

Figure 7:
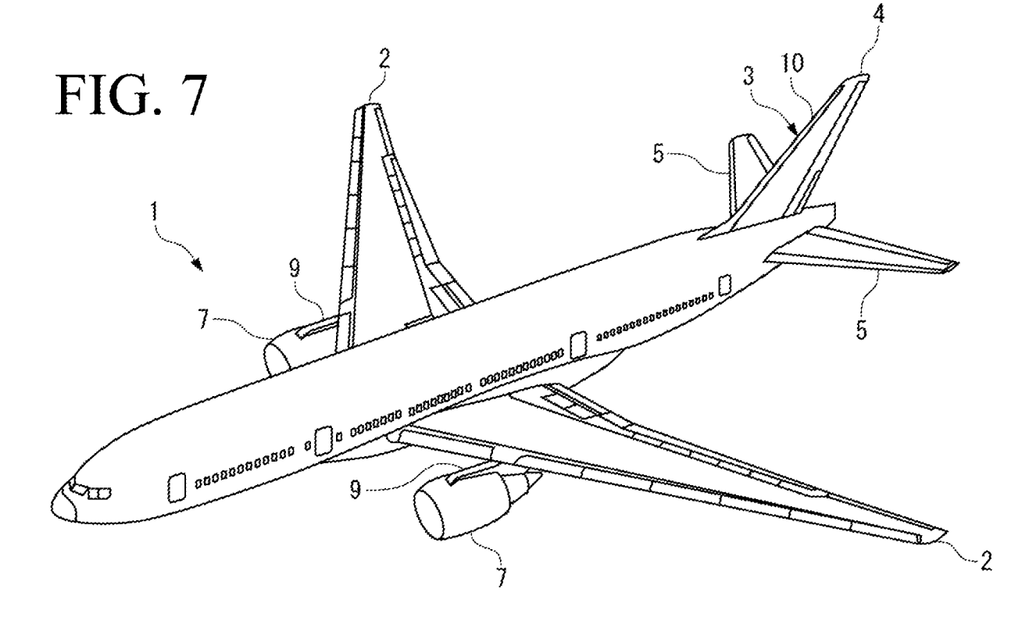
FIG. 7 is a diagram illustrating parts in an aircraft to which the leading-edge structure according to the present invention is applicable.

The present embodiment describes an example in which a leading-edge structure according to the present invention is applied to a vertical tail 3 of an aircraft 1 illustrated in FIG. 7.

The vertical tail 3 includes a leading-edge structure 10 that is oriented toward the front of the aircraft 1. The purpose of providing the leading-edge structure 10 is to prevent the breakage of a wing body 4 of the vertical tail 3 that is provided being connected rearward from the leading-edge structure 10, even in the case of a collision with an airborne object, for example, a bird. In particular, the leading-edge structure 10 in the present embodiment prevents the breakage of the wing body 4 without increasing its weight.

The structure of the leading-edge structure 10 will be described below, followed by the description of effects exerted by the structure. It is noted that, in the present embodiment, "forward" and "rearward" are defined on the basis of a direction in which the aircraft 1 flies.

Figure 1:
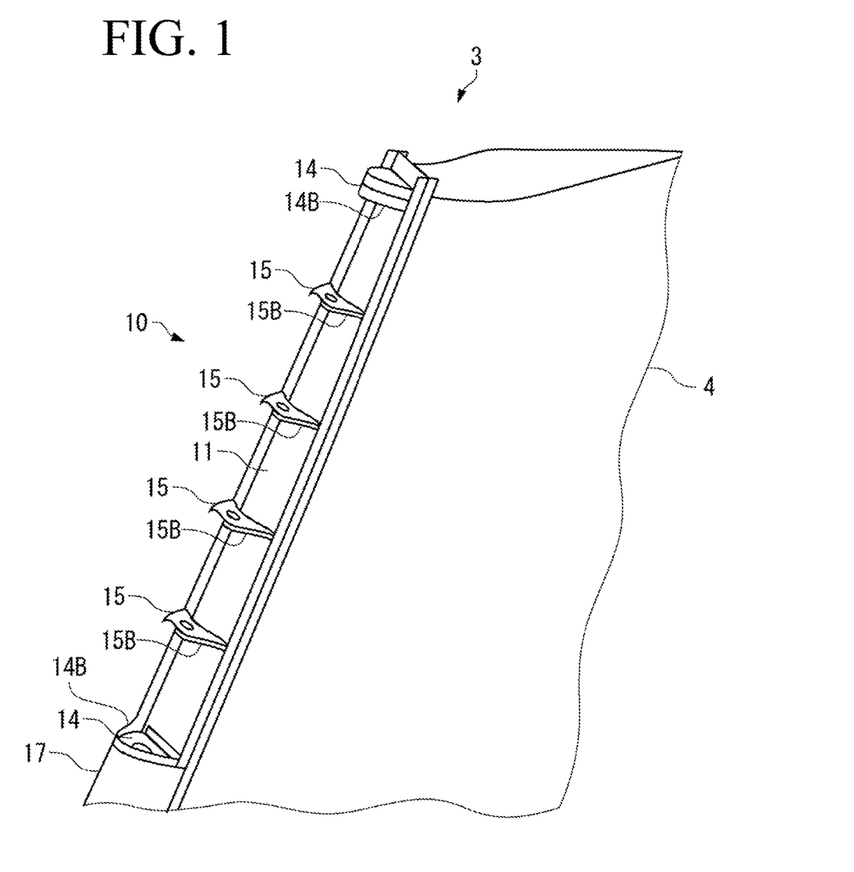
FIG. 1 is a perspective view illustrating the configuration of a leading-edge portion of a vertical tail in an embodiment according to the present invention, with a portion of a skin removed.

The leading-edge structure 10 includes, as illustrated in FIG. 1, a spar 11 that serves as a boundary with the wing body 4, a plurality of ribs (first ribs 14, second ribs 15) that are disposed in the longitudinal direction of the spar 11 at predetermined intervals, and a skin 17 that constitutes an outer shell of the leading-edge structure 10. The spar 11, the ribs (first ribs 14, second rib 15), and the skin 17 constituting the leading-edge structure 10 are manufactured with a structural material, preferably a metallic material such as an aluminum alloy having a high specific strength, and a fiber reinforced plastic such as a carbon fiber reinforced plastic.

The spar 11 is provided in such a manner as to extend in a predetermined direction, exists at a boundary between the leading-edge structure 10 and the wing body 4, and constitutes a part of the wing body 4 on its front-end side. The spar 11 can be formed by joining plate-shaped structural materials together.

The present embodiment is adapted to minimize the breakage of the spar 11 even by an impact of a collision of an airborne object with the leading-edge structure 10.

Next, ribs 13 in the present embodiment, including two kinds of stiffening members, the first ribs 14 and the second ribs 15, support the skin 17.

Figure 2A:
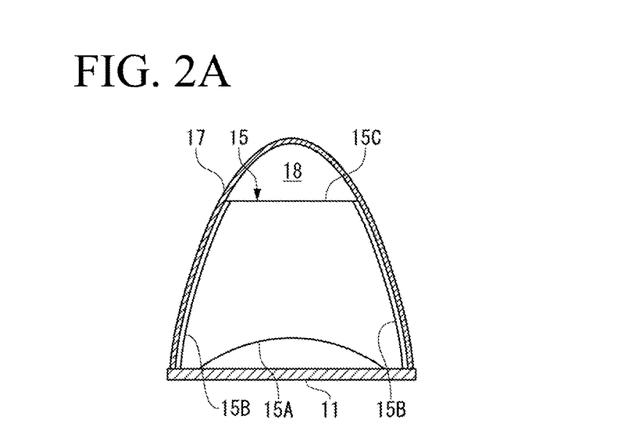
FIG. 2A is a transverse cross sectional view.

The first rib 14 includes, as illustrated in FIG. 1 and FIG. 2A, a rib body 14A that has a spindle-like planar shape extending from a rear end (the lower end of FIG. 2B) to a front end (the upper end of FIG. 2B), and on the circumference of the rib body 14A, flanges 14B that project on both sides in the thickness direction of the rib body 14A.

In the first rib 14, the rear end of the rib body 14A is fixed to the spar 11, and the flanges 14B fix and support the skin 17 with their entire regions from the rear end to the front end. The support of the skin 17 is made by causing a plurality of fasteners (not illustrated) to penetrate from the outside of the skin 17 to the flange 14B so as to fix the skin 17. The fasteners are provided at predetermined intervals in the circumferential direction of the flanges 14B.

There are the plurality of first ribs 14 provided at the predetermined intervals, and between adjacent first ribs 14, a plurality of second ribs 15 are provided. Therefore, the interval between adjacent first ribs 14 is set to be significantly wider than the interval between adjacent second ribs 15.

The first ribs 14 are manufactured to have a high stiffness as compared with the second ribs 15. This enables the skin 17 to be reliably supported to the spar 11.

Figure 2B:
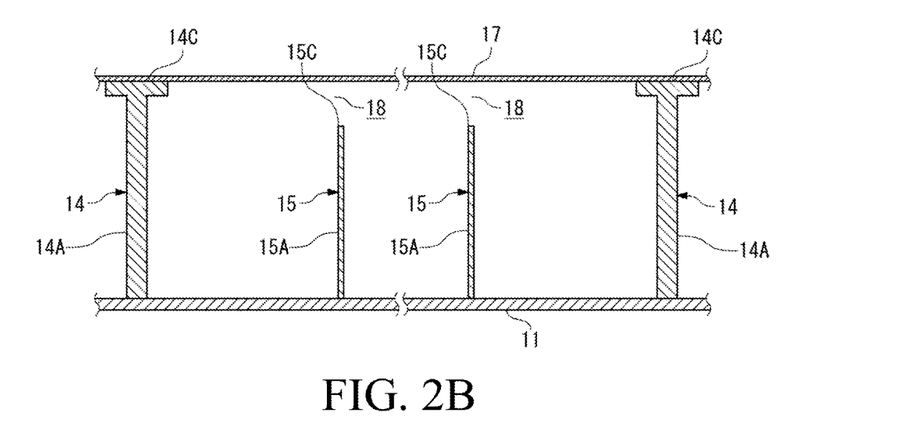
FIG. 2B is a vertical cross sectional view.

Next, the second rib 15 also includes, as illustrated in FIG. 1 and FIG. 2B, a rib body 15A, and on the circumference of the rib body 15A, flanges 15B that project on both sides in the thickness direction of the rib body 15A.

The basic configuration of the second rib 15 having the rib body 15A and the flanges 15B is common to that of the first rib 14, but the planar shape of the rib body 15A is different from that of the rib body 14A. That is, the rib body 15A has a spindle shape similar to that of the rib body 15A up to some extent from the rear end to the front end and have a curvature, but as compared with the rib body 14A, the rib body 15A lacks a portion from the extent, having a front end 15C that forms a straight line.

In the second rib 15, the rear-end side of the rib body 15A is not fixed but only brought into contact with the spar 11, and the flanges 15B supports the skin 17 with their entire regions. The support of the skin 17 is made by, as with the first rib 14, a plurality of fasteners. However, since the front end 15C is linear, and the flange 15B is made to have a dimension in a front-rear direction short as compared with the first rib 14, a gap is provided between the front end 15C and the skin 17. This gap functions as a receiving space 18 that allows the skin 17 to deform rearward. The plurality of second ribs 15 in the present embodiment have the same configuration, and the receiving space 18 is provided in every second rib 15 between its front end 15C and the skin 17. Therefore, the front-end portion of the skin 17 can be considered to be supported at both ends by adjacent first ribs 14.

The skin 17 has, as illustrated in FIG. 1 and FIG. 2A, a crosscut that is spindle-shaped, and is made to cover the first ribs 14 and the second ribs 15 from the forward side, forming the outer shell of the leading-edge structure 10. In addition, the skin 17 is fixed to the first ribs 14 and the second ribs 15 by fasteners (not illustrated), being supported by the first ribs 14 and the second ribs 15. The fasteners are disposed at the predetermined intervals from the front end to the rear end of each of the first ribs 14 and the second ribs 15.

There will be described below effects that are provided by a characteristic support structure of the skin 17 by the first ribs 14 and the second ribs 15.

Figure 3A:
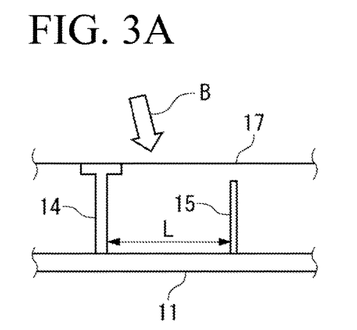
FIGS. 3A-3D are diagrams of the case where an airborne object collides with the vertical tail in the present embodiment, illustrating how the skin and ribs deform and how the collision proceeds.

As illustrated in FIG. 2B, a span between adjacent first ribs 14 is set to be long, and between the first ribs 14, the receiving spaces 18 are provided forward of the front ends 15C of the second ribs 15. Therefore, when the skin 17 receives an external rearward force between the adjacent first ribs 14, the skin 17 can receive this external force over the long span between the adjacent first ribs 14, performing plastic deformation, until the skin 17 bends to touch a second rib 15. This suggests that the support structure of the skin 17 in the present embodiment can absorb more kinetic energy of the external force. This will be described with reference to FIGS. 3A-3D and FIGS. 4A-4D, comparing with a conventional structure that includes, at positions corresponding to the second ribs 15, third ribs 16 supporting the skin 17 with their front ends also as with the first ribs 14. It is assumed that a span L between a first rib 14 and a second rib 15 illustrated in FIG. 3A is equal to a span L between a first rib 14 and a third rib 16 illustrated in FIG. 4A.

FIGS. 3A-3D correspond to the present embodiment, in which a second rib 15 is provided adjacent to a first rib 14.

As illustrated in FIG. 3A, assume that an airborne object, for example, a bird represented by an arrow B, is relatively approaching the leading-edge structure 10. It is noted that the arrow is inclined because the vertical tail 3 including the leading-edge structure 10 has a sweepback angle.

Figure 3B:
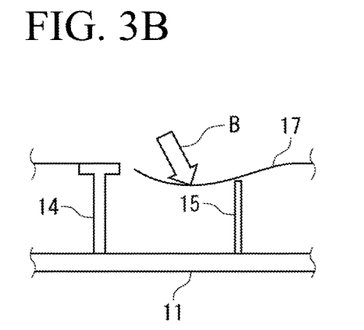

As illustrated in FIG. 3B, when the bird B collides with the skin 17, the skin 17 bends. At the outset, the front end 15C of the second rib 15 is positioned rearward of the skin 17, and thus accordingly, the skin 17 can bend more. Meanwhile, the skin 17 is ruptured at a spot of the first rib 14, and this rupture occurs at a spot where the skin 17 is fixed to the first rib 14 by a fastener (not illustrated). The spot where the fastener penetrates is equivalent to a portion in the skin 17 where a cut-out is formed, having a small strength, and thus suffers a rupture earlier than the other portions.

Figure 3C:
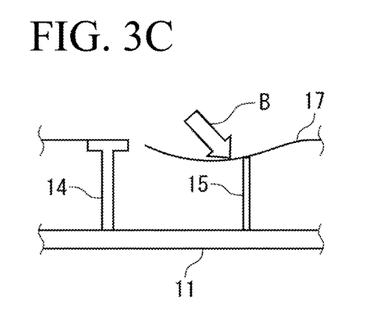
Figure 3D:
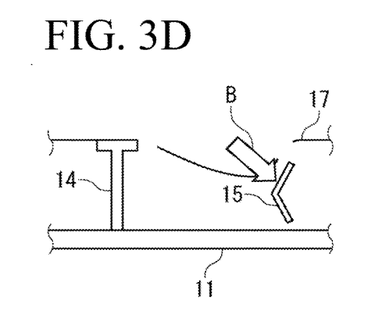

After a lapse of time from the collision of the bird B, the skin 17 is brought into contact with the second rib 15 as illustrated in FIG. 3C. Next, as illustrated in FIG. 3D, when the bird B pushes forward to collide with the second rib 15, the second rib 15 deforms to be broken. Furthermore, since the skin 17 is fixed to the flange 15B by the fastener except for a spot corresponding to the receiving space 18, the skin 17 suffers a rupture at a spot corresponding to the second rib 15.

Figure 4A:
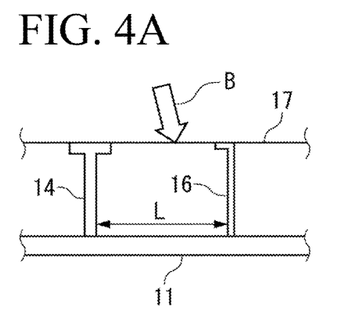
FIGS. 4A-4D are diagrams of the case where an airborne object collides with an aircraft tail in a conventional example, illustrating how a skin and ribs deform and how the collision proceeds.
Figure 4B:
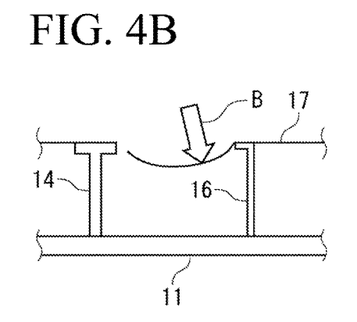
Figure 4C:
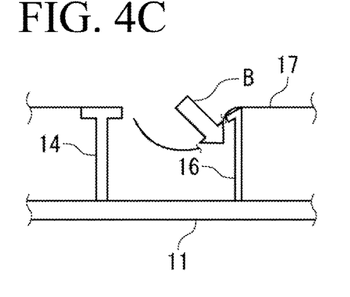
Figure 4D:
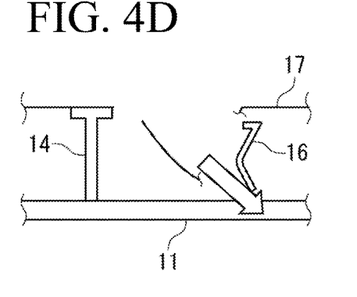

Next, referring to FIGS. 4A-4D, how the skin 17 bends or suffers a rupture is basically the same as in the present embodiment. However, the skin 17 is supported by the third rib 16 from the outset, and as illustrated in FIG. 4B, the skin 17 bends only between the first rib 14 and the third rib 16, which in turn causes plastic deformation of the skin 17 to absorb a small amount of the kinetic energy of the bird B. Furthermore, a rupture of the skin 17 starts in an early stage of the collision, from a fastener at the front end of the third rib 16 as a start point. Therefore, as illustrated in FIG. 4C, the skin 17 suffers a rupture at the spot of the third rib 16 in an early stage. Since there is a significant portion of the kinetic energy of the bird B left, the bird B not only makes the third rib 16 deform but also, as illustrated in FIG. 4D, breaks the spar 11.

In comparison between FIGS. 3A-3D and FIGS. 4A-4D described above, the span between the pair of first ribs 14, by which the skin 17 is supported at both ends, is short in the conventional example than in the present embodiment. Thus, in the present embodiment, more energy is absorbed by the skin 17 with the plastic deformation. Therefore, in the conventional example, the energy of the bird B cannot be absorbed totally only by the deformation of the skin 17 and the third rib 16, and as illustrated in FIG. 4D, the bird B may collide with and break even the spar 11. In contrast, in the present embodiment, the energy of the bird B can be absorbed by the deformation of the skin 17 and the second rib 15, and thus as illustrated in FIG. 3D, it is possible to prevent the bird B from breaking the spar 11.

Figure 5A:
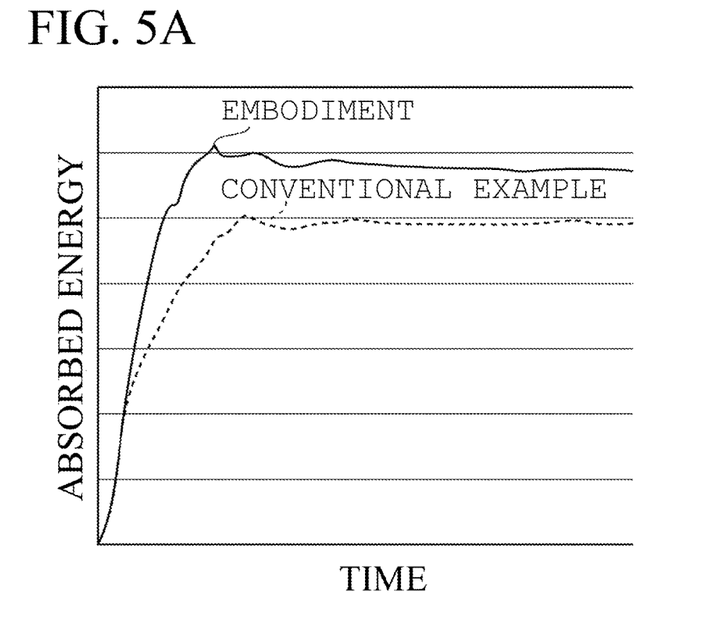
FIG. 5A illustrates the result of the case where an airborne object collides between a first rib and a second rib adjacent to each other.
Figure 5B:
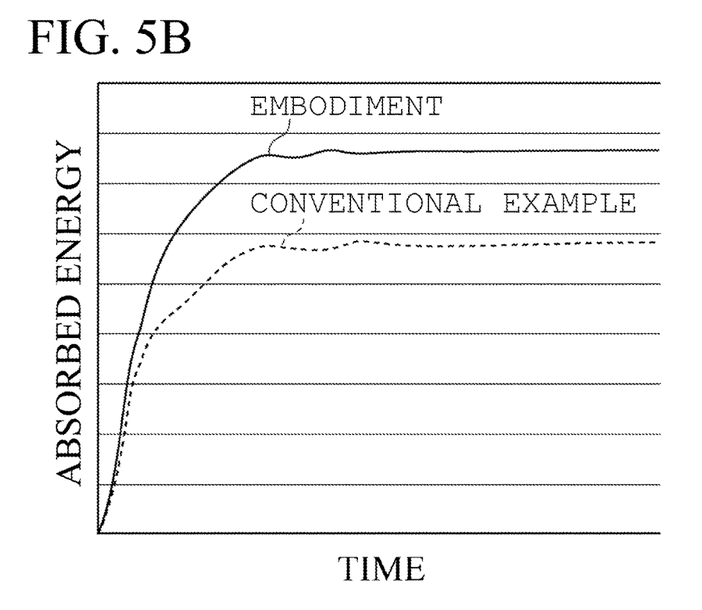
FIG. 5B illustrates the result of the case where an airborne object collides between a second rib and a second rib adjacent to each other.

FIGS. 5A and 5B illustrate the results of simulations to confirm effects of the present embodiment. FIG. 5A illustrates the result of the case where an airborne object (bird B) collides between a first rib 14 and a second rib 15 adjacent to each other, and FIG. 5B illustrates the result of the case where an airborne object collides between a second rib 15 and a second rib 15 adjacent to each other. From these results, the effects of the present embodiment can be confirmed.

Moreover, the mechanism for absorbing energy in the present embodiment needs no addition of a special and unprecedented member, and in addition, the second ribs 15 have a shape made by removing a front-end side from a conventional rib, allowing the reduction of their weights accordingly. Here, the description is made as the front-end side is "removed" from the conventional rib, but in an actual manufacture of a second rib 15, the second ribs 15 can be manufactured to have a linear front end 15C in its original state. Thus, there is no additional step in manufacturing the second ribs 15.

An embodiment according to the present invention has been described above, and the configuration described in the above embodiment may be selected or changed to the other configurations as appropriate, without departing from the gist and scope of the present invention.

Figure 6A:
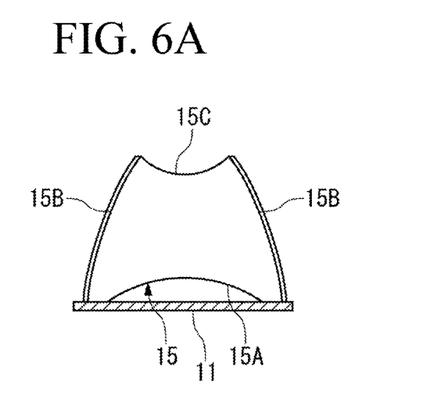
FIGS. 6A-6D are diagrams illustrating other embodiments of the present invention.
Figure 6B:
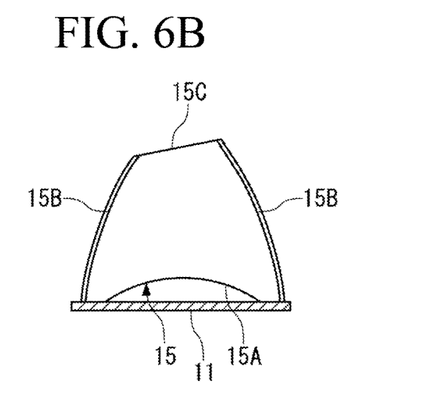

For example, the linear shape of the front end 15C of the second rib 15 is merely an example, and the shape is optional as long as a receiving space 18 is provided between the second rib 15 and the skin 17 in the vicinity of the front end. For example, shapes illustrated in FIG. 6A and FIG. 6B can be employed.

The deformation amount of the skin 17 can be increased with an increase in the receiving space 18, namely, a gap between the front end 15C of the second rib 15 and the skin 17. On the other hand, as the gap becomes large, a range for retaining the skin 17 by the second ribs 15 is decreased accordingly, which in turn reducing the function of stiffening the skin 17. Therefore, the consideration of the above facts helps determine the length of the gap between the front end 15C of the second rib 15 and the skin 17.

Figure 6C:
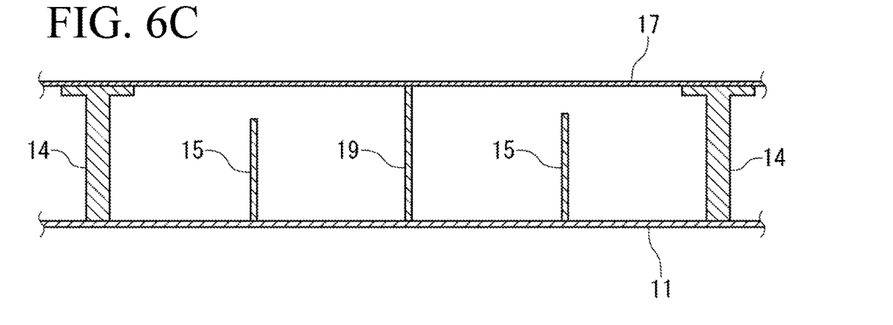
Figure 6D:
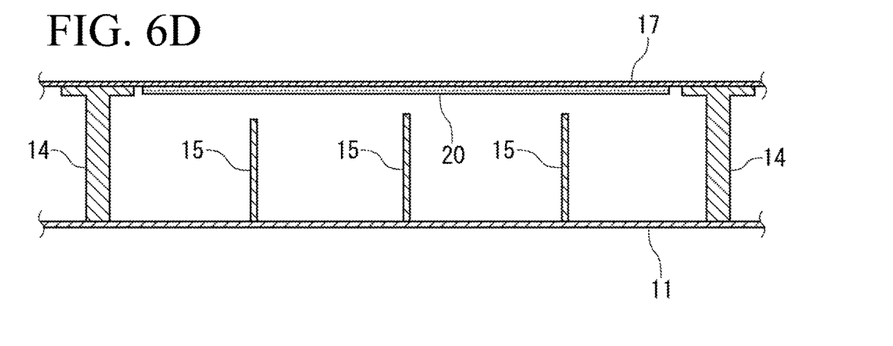

In addition, the embodiment previously described has been made about the example including the pair of first ribs 14, 14 that have a relatively high stiffness and including therebetween the plurality of second ribs 15 that have a relatively low stiffness. However, the present invention is assumed to have a plurality of ribs, and as long as the plurality of ribs include one or more ribs each including a front end provided with a gap with the skin, the effect of the present invention of increasing the amount of plastic deformation of the skin can be exerted. As long as this effect can be exerted, the structure and arrangement of the ribs are optional, and for example, as illustrated in FIG. 6C, a fourth rib 19 can be provided midway between the pair of first ribs 14, 14, the fourth rib 19 having a relatively low stiffness and supporting the skin 17 up to its front end.

In addition, the present invention allows the provision of a stiffening plate 20 for increasing the stiffness of the skin 17, in the gap between the second ribs 15 and the skin 17. For example, in the case where the skin 17 is manufactured from an aluminum alloy, a plate member made of an aluminum alloy can be attached as the stiffening plate 20 to the skin 17 by a jointing method such as friction stir welding and bonding.

In addition, the embodiment previously described has been made about the vertical tail as an example, and the present invention is widely applicable to a leading-edge structure for an aircraft that constitutes any leading-edge portion in the airframe of an aircraft. For example, as illustrated in FIG. 7, the leading-edge structure according to the present invention is also applicable to main wings 2, horizontal tails 5, engine nacelles 7, engine pylons 9, and the like. When applied to the main wing 2, the leading-edge structure according to the present invention is applied to a fixed leading edge that is positioned between a slat positioned foremost and a main wing body of a box structure.

What is claimed is:

1. A leading-edge structure for an aircraft that constitutes any leading-edge portion in an airframe of the aircraft, the leading-edge structure comprising:
   a spar that extends in a predetermined direction;
   a plurality of ribs that are provided in the predetermined direction of the spar at intervals; and
   a skin that is supported by the plurality of ribs, wherein:
   among the plurality of ribs, one or more of the ribs have a front end that is provided with a gap with the skin,
   as the plurality of ribs, the leading-edge structure comprises:
      a pair of first ribs that are disposed at a predetermined interval, and
      a plurality of second ribs that are disposed between the pair of first ribs, the second ribs each having the front end provided with the gap with the skin,
   the pair of first ribs are fixed to the spar, and
   the second ribs are not fixed to the spar.

2. The leading-edge structure for an aircraft according to claim 1, wherein the pair of first ribs have a stiffness higher than a stiffness of the second ribs.

3. A wing of an aircraft comprising the leading-edge structure according to claim 1 and a wing body that is connected to the leading-edge structure.

4. The wing of an aircraft according to claim 3, wherein the leading-edge structure and the wing body constitute at least one of a main wing, a horizontal tail, and a vertical tail.

5. The wing of an aircraft according to claim 3, wherein the leading-edge structure and the wing body constitute a vertical tail.

6. An aircraft comprising the wing according to claim 3.

7. The leading-edge structure for an aircraft according to claim 1, wherein
   the spar is located at a boundary between the leading-edge structure and a wing body that is connected to the leading-edge structure.

8. The wing of an aircraft according to claim 3, wherein
   the spar is located at a boundary between the leading-edge structure and the wing body.

9. The leading-edge structure for an aircraft according to claim 1, wherein
   the first ribs and the second ribs have different shapes from each other.

10. The leading-edge structure for an aircraft according to claim 1, wherein
    each of the second ribs has a linear front end that faces the skin.

11. The leading-edge structure for an aircraft according to claim 9, wherein
    the second ribs are configured to have a small dimension in a front-rear direction with respect to the first ribs.

12. A wing of an aircraft comprising the leading-edge structure according to claim 2 and a wing body that is connected to the leading-edge structure.

13. A wing of an aircraft comprising the leading-edge structure according to claim 7 and a wing body that is connected to the leading-edge structure.

14. A wing of an aircraft comprising the leading-edge structure according to claim 9 and a wing body that is connected to the leading-edge structure.

15. A wing of an aircraft comprising the leading-edge structure according to claim 10 and a wing body that is connected to the leading-edge structure.

16. An aircraft comprising the wing according to claim 12.

17. An aircraft comprising the wing according to claim 13.

18. An aircraft comprising the wing according to claim 14.

19. An aircraft comprising the wing according to claim 15.

* * * * *